T. E. MORFORD.
METHOD OF INSULATING ELECTRIC CONDUCTORS.
No. 11,303. Reissued Feb. 7, 1893.
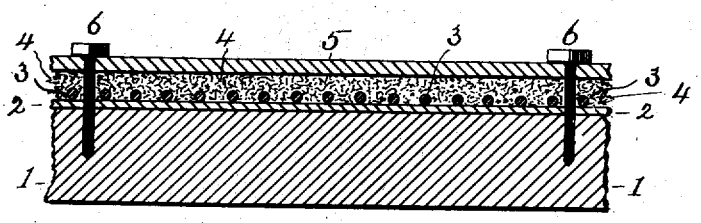
Witnesses:
R. Bloom
J. L. Dobbin
Inventor:
Thomas E. Morford
By his Attorney
P. H. Gunckel

UNITED STATES PATENT OFFICE.

THOMAS E. MORFORD, OF CHICAGO, ILLINOIS, ASSIGNOR, BY DIRECT AND MESNE ASSIGNMENTS, TO THE ENAMEL INSULATOR COMPANY, OF ILLINOIS.

METHOD OF INSULATING ELECTRIC CONDUCTORS.

SPECIFICATION forming part of Reissued Letters Patent No. 11,303, dated February 7, 1893.

Original No. 457,828, dated August 18, 1891. Application for reissue filed June 3, 1892. Serial No. 435,455.

*To all whom it may concern:*

Be it known that I, THOMAS E. MORFORD, a citizen of the United States, residing at Chicago, in the county of Cook and State of Illinois, have invented certain new and useful Improvements in Methods of Insulating Electric Conductors, of which the following is a specification.

The object of my invention is the insulation of electric conductors from devices that are to be heated by means of an electric current—such devices for example as sad-irons, cooking utensils, &c.; but the invention may also be applied to other devices than such as are required to be heated to fit them for performing other functions.

My method, stating in a general way, of insulating an electric conductor from an object on which it is supported or carried, consists in separating the conductor from the object by means of a non-conducting enamel or glaze or film that is made adherent to the object, laying an electric conductor or resistance on the enameled surface, and next placing over this a yielding non-conducting material and compressing it toward the object.

In illustration of the manner of carrying out my method of insulation, I have shown in the accompanying drawing a base or object 1, (which, for example, may be the surface plate of a sad-iron,) which has an enameled surface 2 laid on a conductor 3, and over this a compressible non-conducting substance 4 which is compressed by means of a pressure plate 5, that is connected to the base, by screws or bolts 6, or equivalent means.

In carrying out my method the base 1, is coated with a non-conducting enamel, glaze or film 2, which is then hardened and made adherent by the usual processes; on this is then laid the conductor or resistance 3 and over this is placed some loose or soft non-conducting substance 4, such as asbestus, and over this is placed the pressure plate 5, which is drawn toward the base by means of the screws or bolts 6, or otherwise, so as to compress the non-conducting substance and cause it to completely surround the coils of the conductor and bind the latter to the base.

Having described my invention what I claim is:

1. The method of electric insulation, which consists in coating an object with a non-conducting substance that is made to adhere thereto and harden, next laying thereon an electric conductor, and next covering that with a non-conducting material and compressing it.

2. The method of insulating an electric resistance from a body to be heated thereby, which consists in coating the body with an adherent insulating enamel, glaze or film, laying thereon the resistance, and then placing over the same a compressible non-conducting substance and compressing it, substantially as set forth.

THOMAS E. MORFORD.

Witnesses:
JAS. B. MORFORD,
JOHN DRAEK.